United States Patent [19]

Bekele

[11] Patent Number: 5,491,009
[45] Date of Patent: Feb. 13, 1996

[54] AMORPHOUS NYLON COMPOSITION AND FILMS

[75] Inventor: Solomon Bekele, Taylors, S.C.

[73] Assignee: W. R. Grace & Co.-Conn., Duncan, S.C.

[21] Appl. No.: 562,514

[22] Filed: Aug. 3, 1990

[51] Int. Cl.⁶ .......................... B29D 22/00; B32B 27/08
[52] U.S. Cl. ...................... 428/35.7; 428/36.7; 428/69; 428/474.4; 428/474.3; 428/475.5; 428/475.8; 428/476.3; 428/476.1; 428/476.9
[58] Field of Search ................... 428/474.4, 474.9, 428/475.5, 475.8, 476.3, 476.1, 476.9, 69, 36.7, 35.7

[56] References Cited

U.S. PATENT DOCUMENTS

| | | | |
|---|---|---|---|
| 3,150,117 | 9/1964 | Gabler | 260/78 |
| 3,624,941 | 2/1972 | Schneider et al. | 260/857 |
| 3,646,156 | 2/1972 | Schneider et al. | 260/857 |
| 4,044,187 | 8/1977 | Kremkau | 156/272.2 |
| 4,284,674 | 8/1981 | Sheptak | 428/69 |
| 4,404,317 | 9/1983 | Epstein et al. | 524/538 |
| 4,410,661 | 10/1983 | Epstein et al. | 525/66 |
| 4,486,507 | 12/1984 | Schumacher | 428/476.1 |
| 4,515,924 | 5/1985 | Brooks et al. | 525/432 |
| 4,542,047 | 9/1985 | Donermeyer et al. | 427/374 |
| 4,746,562 | 5/1988 | Fant | 428/213 |
| 4,826,955 | 5/1989 | Akkapeddi et al. | 528/324 |
| 4,909,726 | 3/1990 | Bekele | 428/343 |
| 4,927,691 | 5/1990 | Bekele | 428/35.2 |

FOREIGN PATENT DOCUMENTS

| | | |
|---|---|---|
| 0243510 | 4/1987 | European Pat. Off. . |
| 0222632 | 11/1987 | Netherlands . |

OTHER PUBLICATIONS

Novamid X21, Mitsubishi Kasei.
Engineering Resins, Emser Ind.
New Film Co–Extrusion Dev, Proceedings of the F.
High Barrier Amorphous NY, Proceedings of the F.

*Primary Examiner*—Leszek Kiliman
*Attorney, Agent, or Firm*—Mark B. Quatt

[57] ABSTRACT

A multi-layer film useful in vacuum skin packaging and other packaging applications, and having a combination of good implosion resistance, formability and high oxygen barrier characteristics, includes a core layer having an oxygen barrier material such as ethylene vinyl alcohol copolymer (EVOH) and a layer or layers comprising an amorphous nylon with or without a low flexural modulus polymeric material such as low modulus nylon (polyamide or copolyamide). Layers of ethylene vinyl acetate copolymer (EVA) or other olefin homopolymers or copolymers, polymeric adhesive layers, a heat-sealable layer, and a heat resistant layer are also disclosed. A composition of matter comprising a blend of an amorphous nylon and a low modulus polymeric material, especially a low modulus nylon, is also disclosed.

9 Claims, 1 Drawing Sheet

AMORPHOUS NYLON COMPOSITION AND FILMS

BACKGROUND OF THE INVENTION

The present invention relates to packaging films, and more specifically to packaging films useful in vacuum packaging applications, and compositions for use in those films.

Vacuum packaging, and particularly vacuum skin packaging (VSP) has become an increasingly attractive way of packaging fresh red meats. The final package presents a tight fitting, clear package which protects the food article from the external environment. However, the demands imposed on the packaging material used in vacuum packaging, and especially in vacuum skin packaging, are high.

Three particular characteristics which are especially desirable in vacuum skin packaging applications, especially in the packaging of fresh beef, pork, broiled and browned pork, shingled turkey breast, and other meat items, are implosion or breakage resistance, forming ability and shelf life.

Generally, products that have cavities or undercuts are especially prone to implosions or leakers created by failure of the film during the vacuum skin packaging process. Using some materials, package failures as high as 60% have occurred. Thus, in actual practice, conventional films are sometimes broken when subjected to the high stretch ratios and particular projections, undercuts or recesses present on the material being packaged.

Good forming ability is also highly desirable in VSP applications to ensure that the heated film adequately conforms to the shape of the packaged product.

At the same time, high oxygen barrier characteristics are required in packaging material where the product to be packaged is sensitive to and degrades in the presence of oxygen. Fresh red meat products in particular typically require packaging materials with high oxygen barrier properties in order to ensure adequate or extended shelf life during storage, distribution and retail display under high as well as low humidity conditions.

The vacuum skin packaging process itself is now well known in the art. The packaging material generally comprises a top web and a bottom web which are each sent to the packaging station. The meat or other food to be packaged is placed onto the bottom web before the packaging station. The upper web comprises a film of a thermoplastic material which is optionally preheated and then fed to the packaging station and over the product on the bottom web. There it is usually heated by contact with a heated member, for instance the inner surface of a "dome". The space between the top and bottom webs around the food is then evacuated and the top web is allowed to come into contact with the bottom web and with the food. The top web may be held against the dome for instance by vacuum pressure which is released when it is desired to allow the top web to come into contact with the bottom web. Sealing of the top and bottom webs is achieved by a combination of heat from the dome and pressure difference between the inside of the package and the outside atmosphere and can be aided by mechanical pressure and/or extra heating. The heat that is supplied in the process is merely to allow the web to form and take up the form of the food product being packaged.

The implosion resistant films as described for example in U.S. Pat. No. 4,927,691 (Bekele) offer improved implosion resistance and resistance to bridging, good formability, and good overall oxygen barrier properties. It was nevertheless found desirable to provide a film with good implosion resistance, as well as good forming ability, which had improved oxygen barrier properties at relatively high humidities, where ethylene vinyl alcohol copolymer is especially susceptible to degradation in barrier properties as a result of the presence of moisture. This property of EVOH is well known in the art.

As taught for example in the brochure Engineering Resins produced by Emser Industries, amorphous nylon such as the Grivory™ G21 resin has excellent oxygen barrier properties at higher humidity conditions, and at 100% relative humidity is actually superior in oxygen barrier to EVOH resins. However, use of the amorphous nylon alone in multilayer films offers poor implosure resistance, unacceptable forming ability, and unacceptable oxygen barrier properties under low humidity conditions. This is especially true for the packaging of products such as fresh red meats in a vacuum or vacuum skin package process.

The inventor has found that by using both an amorphous nylon and an oxygen barrier material such as ethylene vinyl alcohol copolymer, very good oxygen barrier properties are obtained in the resulting film under both low and high humidity conditions.

In applications where good implosion resistance and forming ability is also required, the inventor has also found that these properties in the final film can be greatly enhanced by blending the amorphous nylon layer or layers of the multi-layer film with a low modulus polymeric material, more preferably a low modulus nylon (polyamide or copolyamide) such as nylon 6, 12; nylon 12; nylon 11; nylon 6, 66; nylon 6, 69; and nylon 610.

In applications where even better oxygen barrier performance at relative high humidities is desired, the most preferred modifiers for the amorphous nylon, i.e. blending materials, are nylon 6, 12; nylon 12; and nylon 11. This last group of materials is more moisture resistant, i.e. absorbs less moisture and transmits less moisture than many other nylon materials. In film where the primary oxygen barrier material such as EVOH is sandwiched between layers of an amorphous nylon blended with one of the above modifiers, especially the moisture resistant modifiers, moisture on the inside or the outside of a package formed from the film is substantially prevented from reaching the EVOH layer. This of course helps to prevent the oxygen barrier of the properties of the EVOH layer, and the overall film, from degrading in the presence of the high humidity environment.

DEFINITIONS

The term "amorphous nylon" is used herein to distinguish those polyamides and copolyamides with a relatively amorphous structure from those more conventional crystalline and semi-crystalline nylons such as nylon 6, nylon 6, 66 etc. which are also well known in the art. Some amorphous nylons are copolyamides of an aliphatic hexamethylene diamide, and an aromatic isophthalic acid and terephthalic acid. Generally, amorphous polyamides can be characterized as high molecular weight polymers in which amide linkages occur, and contain aromatic segments with various proportions of aliphatic segments when produced as film grade resins. Many of the patents and publications referred to above describe specific amorphous nylon or amorphous polyamide or copolyamide compositions. The terms "nylon" and "polyamide" or "copolyamide" are used throughout the specification interchangeably.

The term "low modulus" refers to materials which contribute flexibility to the final film construction. Put differently, the term refers to those materials which, when included in the film, result in a film with greater flexibility (lower flexural modulus) than would be obtained without the presence of the modifier. Modulus values for these modifiers of less than about $2.0 \times 10^6$ kPa (ASTM D 790) are preferred.

"Chemically modified" is used herein to describe polymeric materials, especially polymeric adhesives, which have a base resin, usually a polyolefin, blended with a graft copolymer. The grafted material is often a carboxylic acid or acid anhydride, such as maleic anhydride. Other chemical means of enhancing the adhesive properties of a given polyolefin are also included within this term.

PRIOR ART STATEMENT

U.S. Pat. No. 3,150,117 (Gabler) discloses an amorphous polyamide for use in clear films.

U.S. Pat. No. 3,642,941 (Schneider et al) discloses molding materials made from a blend of crystallized polyamide and an amorphous polyamide.

U.S. Pat. No. 3,646,156 (Schneider et al) discloses a molding composition comprising amorphous polyamide and polyamide of the nylon type.

U.S. Pat. No. 4,404,317 (Epstein et al) discloses blends of semicrystalline polyamide and amorphous copolyamide for molded articles.

U.S. Pat. No. 4,410,661 (Epstein et al) discloses blends of semicrystalline polyamide, amorphous polyamide, and toughening agents for producing automobile fenders, bumpers and the like, and long shapes, films, rods and tubes.

U.S. Pat. No. 4,486,507 (Schumacher) discloses a transparent, shrinkable film with a layer of a mixture of linear polyamide or copolyamide and partially aromatic polyamide or copolyamide.

U.S. Pat. No. 4,515,924 (Brooks et al) discloses polyamide-imide polymers containing amorphous and semi-crystalline polyamides.

U.S. Pat. No. 4,542,047 (Donermeyer et al) discloses hot melt adhesive which is a block copolymer having crystalline polyamide segments and amorphous polyamide segments.

U.S. Pat. No. 4,826,955 (Akkapeddi et al) discloses a multi-layer coextruded film with outer polyolefin layers, intermediate tie layers, and a central layer of an amorphous copolyamide.

U.S. Pat. No. 4,909,726 (Bekele) discloses a film for chub packaging in which a core layer of EVOH is adhered to a first intermediate layer of a copolyamide (nylon 6,66; nylon 6,69; nylon 6,12) or nylon 6. A second intermediate layer, adhered to the core layer, is copolyamide, nylon 6, or nucleated nylon 6.

U.S. Pat. No. 4,927,691 (Bekele) discloses implosion resistant films with an EVOH core layer, intermediate layers of EVA, and a high density polyethylene abuse layer.

European patent publication 243510 (Botto et al) disclosing a coextruded multi-layer film having the structure ionomer/EVA (18%)/adhesive/EVOH/adhesive/EVA (18%)/high density polyethylene. The film in that disclosure is useful in vacuum packaging food products. "EVOH" here represents ethylene vinyl alcohol copolymer. "EVA" here represents ethylene vinyl acetate copolymer. Several similar structures are also disclosed in the Botto et al reference.

New Zealand Patent Specification No. 222632 laid open to public inspection on Jul. 27, 1989 discloses a film extrusion containing a polyamide mixture of 35 to 85% by weight of a highly crystalline polyamide, and 15 to 65% of amorphous polyamide.

A brochure from Mitsubishi Chemicals entitled Novamid X 21 discloses an amorphous nylon which may possibly be mixed with such other nylons as nylon 6 for processing into film or sheet.

A brochure from Emser Industries entitled Engineering Resins discloses the mixture of nylon 6 and amorphous nylon for use in barrier films.

A paper entitled New Film Co-Extrusion Developments in New Zealand and Australia, R. A. Cassey, found in Proceedings of the Fifth Annual International Co-extrusion Conference and Exhibition discloses a thermoformable multilayer film including an outer nylon layer and a special nylon layer to eliminate flex cracking.

A paper entitled High Barrier Amorphous Nylon Resins and Extensions of the Laminar Technology, R.A.L. Eidman, found in Proceedings of the Fifth Annual International Coextrusion Conference and Exhibition discloses the use of amorphous nylon in coextruded sheet.

OBJECTS OF THE INVENTION

It is an object of the present invention to provide a packaging material useful in vacuum packaging and especially vacuum skin packaging applications.

It is a further object to provide a material which has good resistance to implosion or breakage, good formability, combined with extended shelf life for food products such as fresh red meat products.

Another object of the invention is to provide a composition of matter which can be used in flexible films, and offer good oxygen barrier properties (i.e. low oxygen transmission rates).

SUMMARY OF THE INVENTION

In one aspect of the invention, a high oxygen barrier implosion resistant film comprises a first layer comprising a heat sealable polymeric material; a second layer comprising an olefin polymer or copolymer; a third layer comprising a polymeric adhesive; a fourth layer comprising amorphous nylon; a fifth layer comprising an oxygen barrier material; a sixth layer comprising amorphous nylon; a seventh layer comprising a polymeric adhesive; an eighth layer comprising an olefin polymer or copolymer; and a ninth layer comprising a heat resistant polymeric material.

In another aspect of the invention, a composition of matter comprises a blend of an amorphous nylon and a low modulus polymeric material.

In another aspect of the invention, a composition of matter comprises a blend of an amorphous nylon and a low modulus moisture resistant polymeric material.

The invention is, in another aspect, a monolayer or multilayer film which includes a blend of an amorphous nylon and a low modulus polymeric material.

In still another aspect, the invention is a monolayer or multilayer film which includes a blend of an amorphous nylon and a low modulus moisture resistant polymeric material.

BRIEF DESCRIPTION OF THE DRAWINGS

Further details are given below in reference to the sole drawing FIGURE wherein.

DESCRIPTION OF THE PREFERRED EMBODIMENTS

Figure 1:
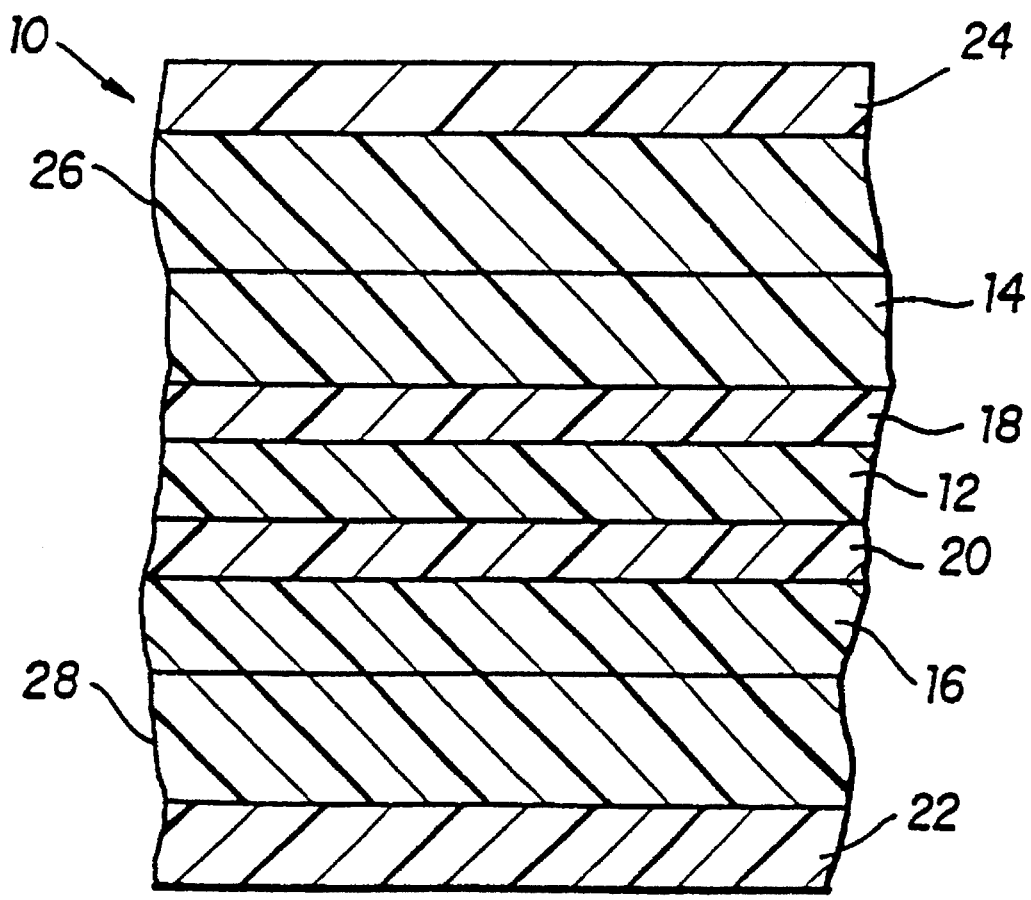
FIG. 1 is a schematic cross section of the preferred embodiment of a multi-layer film of the invention.

Referring to FIG. 1 a nine layer film 10 is designated primarily for vacuum packaging and especially for vacuum skin packaging.

The core layer 12 of this film is an oxygen barrier material designed to provide increased shelf life in applications where the packaged product is sensitive to and deteriorates from the presence of oxygen in the interior environment of the package. Such applications are especially useful in packaging fresh red meats and other meat products and cheeses. In this embodiment, core layer 12 comprises an oxygen barrier material and preferably ethylene vinyl alcohol copolymer. Other oxygen barrier resins can be used, such as vinylidene chloride copolymer (PVDC) and polyamides such as nylon 6. However, in fully coextruded embodiments of the present invention, EVOH is preferred because it processes better with less heat degradation than PVDC. Also, in crosslinked or irradiated embodiments, PVDC will degrade and discolor. At low relative humidities, EVOH has oxygen barrier properties superior to PVDC and far superior to nylon.

Layers 26 and 28 preferably comprise ethylene vinyl acetate copolymer (EVA), or alternatively other ethylene homopolymers or copolymers such as ethylene n-butyl acrylate copolymer (EnBA).

Preferable EVA resins are those with relatively high vinyl acetate content, more preferably between about 15 and 25% vinyl acetate by weight, and most preferably about 18% vinyl acetate by weight of the copolymer.

A suitable resin for layers 26 and 28 is Elvax™ 3165 available from Dupont Chemicals, with a melt index of about 0.7 decigrams per minute (ASTM D1238). An alternative resin is Norchem NPE 3311™, having a vinyl acetate content of 19% by weight, and a melt index of between about 2.5 and 3.5 decigrams per minute (ASTM D1238).

Optionally, chemically modified adhesives such as Plexar™ 107 can be included in layers 26 and/or 28 to enhance the adhesion of these layers to adjacent layers.

Layers 14 and 16 comprise a polymer and preferably a polyolefin and more preferably low density polyethylene. This material is preferably chemically modified to enhance its adhesive characteristics. One example of a suitable resin for layers 14 and 16 is Plexar™ 169, a chemically modified low density polyethylene available from Quantam/USI. Another suitable material is Bynel™ 385 from Dupont.

Layer 22 comprises a heat resistant material and preferably high density polyethylene. A suitable commercial material is Fortiflex™ J60-800C-147, a high density polyethylene available from Soltex.

The other outer layer, layer 24, is useful as a sealant layer when sealing the multi-layer film to itself or to another film or laminate. It preferably comprises a heat sealable polymeric material and more preferably a very low density polyethylene such as Attane™ 4004 available from Dow. Other ethylene alpha-olefin copolymers including those commonly designated as linear low density polyethylene or very low density polyethylene may be used. Ionomer resins and ethylene vinyl acetate copolymer may also be used for sealant layer 24. In the heat sealable layer 24, small amounts of suitable additives can be added such as antiblocking agents to enhance the handling and usefulness of the packaging material of the present invention.

It is well known that ethylene vinyl alcohol copolymer, the preferred material for core layer 12, exhibits very high oxygen barrier characteristics at low relative humidities, but lesser barrier characteristics (ie, greater oxygen transmission) at higher relative humidities. To protect the core layer to some extent from excessive exposure to moisture either from the contained food product such as fresh red meat, or from the outside environment (ie, outside the package material wall) layers 18 and 20 are included in the preferred packaging material structure. These layers also provide good oxygen barrier properties in relatively high humidity environments.

The preferred material for layers 18 and 20 is amorphous nylon. Commercial examples include Selar™ PA 3426, an amorphous nylon produced by du Pont; and Grivory™ 21, an amorphous nylon produced by Emser Industries. Other amorphous nylons that can be used in this invention include Selar PA 3508, a lower viscosity version of the Selar PA 3426 material; Gelon™ A 100 available from General Electric; Durathan™ T 40 from Mobay; Allied XA 1722 available from Allied-Signal; Novamid™ X 21 available from Mitsubishi Chemical Industries Limited; and MXD 6 available from Mitsubishi Gas Chemical Co., Inc.

It has been found that the shelf life of meat products packaged in materials of the present invention has been extended from about five days to fourteen days or more. Even allowing for differences in the thickness of the core layer of EVOH, shelf life has been doubled by the use of the present materials compared with packaging materials having a similar structure but no moisture resistant layers 26 and 28.

The inventor has found that the combination of a core layer of EVOH with adjacent, "sandwiching" layers of amorphous nylon in a multi-layer film structure offers excellent oxygen barrier properties at both low and high relative humidities.

In end use applications such as vacuum skin packaging, it is desirable to provide extended shelf life (i.e. high oxygen barrier properties) without sacrificing implosion resistance or forming ability. This is achieved in the present invention by including in at least one of layers 18 and 20, a low modulus modifier. Especially preferred modifiers are low modulus nylons (polyamides or copolyamides) such as nylon 6,12 (the polycondensation product of hexamethylene diamine and a 12-carbon dibasic acid); nylon 12 (the polymerization product of lauric lactam or cyclododecalactam, with 11 methylene units between the linking —NH—CO— groups in the polymer chain); nylon 11 (the polycondensation product of the monomer 11-aminoundecanoic acid); nylon 6,66 (the polycondesation product of hexamethylenediamine and hexamethylene adipamide); nylon 6,69 (the polycondesation product of hexamethylenediamine and hexamethylene nonanoamide); and nylon 610 (polyhexamethylene sebacamide).

Commercial resins available for each type include: for nylon 6,12: CR 9, CA 6E, and CF 6S (Emser), 7024 B, 7028 B, and 7128 B (Ube), and Vestamid D 12, D 14, and D 16 (Huels); for nylon 12: Vestamid L 1600, L 1700, and L 1801 (Huels), BESNO (Atochem), Grilamid TR 55 (Emser), and Ube 3024 B (Ube); for nylon 11: BESNO (Atochem); for nylon 6,66: Ultramid C 35 (BASF), and Xtraform 1539 and 1590 (Allied); for nylon 6,69: Grilon CF 62 BSE and XE 3222 (Emser); and for nylon 6,10: Ultramid S3 and S4 (BASF).

Substantial improvement in shelf life, without significant loss of implosion resistance has been obtained by the use of the present invention.

The film of the present invention is preferably produced by conventional coextrusion techniques wherein coextrusion of the various layers produces the final multilayer film.

The coextruded tape resulting from the coextrusion of the individual layers is preferably irradiated to between about 9 and 18 megarads dosage and most preferably to between about 12 to 14 megarads dosage.

To some extent, chemical cross-linking agents may be utilized in addition to or in lieu of irradiation of the coextruded tape.

Preferred thicknesses of the preferred embodiment are either four mils or six mils. Of course, variations in the initial coextruded tape thickness and the final film thickness can be made.

The individual layers may vary in thickness, although for the sake of economy the core layer 12 is preferably a relatively thin layer.

Modifications of the invention within the purview of one skilled in the art are believed to be within the spirit and scope of the invention as claimed below. Certain modifications such as the use of conventional lamination or extrusion coating techniques instead of coextrusion will be obvious to those skilled in the art after a review of the specification.

Also, monolayer or multilayer films including the composition of a blend of amorphous nylon and a low flexural modulus modifier are contemplated within the present invention.

What is claimed is:

1. A high oxygen barrier implosion resistant film comprising:
    a) a first layer comprising a heat sealable polymeric material;
    b) a second layer comprising an olefin polymer or copolymer;
    c) a third layer comprising a polymeric adhesive;
    d) a fourth layer comprising amorphous nylon;
    e) a fifth layer comprising an oxygen barrier material;
    f) a sixth layer comprising amorphous nylon;
    g) a seventh layer comprising a polymeric adhesive;
    h) an eighth layer comprising an olefin polymer or copolymer; and
    i) a ninth layer comprising a heat resistant polymeric material.

2. The film according to claim 1 wherein the first layer comprises a heat sealable polymeric material selected from the group consisting of:
    a) a very low density polyethylene;
    b) other ethylene alpha - olefin copolymer;.
    c) an ionomer resin; and
    d) an ethylene vinyl acetate copolymer.

3. The film according to claim 1 wherein the second and eighth layers each comprise an olefin polymer or copolymer selected from the group consisting of:
    a) ethylene vinyl acetate copolymer; and
    b) ethylene alkyl acrylate copolymer.

4. The film according to claim 1 wherein the third and seventh layers each comprise a polymeric material selected from the group consisting of low density polyethylene.

5. The film according to claim 1 wherein the fourth and sixth layers each comprise a blend of an amorphous nylon and a low flexural modulus polymeric material.

6. The film according to claim 1 wherein the fourth and sixth layers each comprise a blend of an amorphous nylon with a crystalline or semicrystalline low modulus polyamide or copolyamide selected from the group consisting of:
    a) nylon 6,12;
    b) nylon 12;
    c) nylon 11;
    d) nylon 6,66;
    e) nylon 6,69; and
    f) nylon 610.

7. The film according to claim 1 wherein the fifth layer comprises an oxygen barrier polymeric material selected from the group consisting of ethylene vinyl alcohol copolymer, vinylidene chloride copolymer, and nylon.

8. The film according to claim 1 wherein the ninth layer comprises a high density polyethylene.

9. The film according to claim 1 wherein the film is cross-linked.

* * * * *